United States Patent
Singh et al.

(10) Patent No.: US 11,950,178 B2
(45) Date of Patent: Apr. 2, 2024

(54) METHODS, SYSTEMS, AND COMPUTER READABLE MEDIA FOR OPTIMIZED ROUTING OF SERVICE BASED INTERFACE (SBI) REQUEST MESSAGES TO REMOTE NETWORK FUNCTION (NF) REPOSITORY FUNCTIONS USING INDIRECT COMMUNICATIONS VIA SERVICE COMMUNICATION PROXY (SCP)

(71) Applicant: Oracle International Corporation, Redwood Shores, CA (US)

(72) Inventors: Virendra Singh, Bangalore (IN); Jay Rajput, Bangalore (IN); Ankit Srivastava, Uttar Pradesh (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/392,288

(22) Filed: Aug. 3, 2021

(65) Prior Publication Data
US 2023/0042219 A1 Feb. 9, 2023

(51) Int. Cl.
*H04W 48/16* (2009.01)
*H04W 24/02* (2009.01)
(Continued)

(52) U.S. Cl.
CPC .......... *H04W 48/16* (2013.01); *H04W 24/02* (2013.01); *H04W 40/06* (2013.01); *H04W 40/20* (2013.01); *H04W 40/242* (2013.01)

(58) Field of Classification Search
CPC ..... H04W 48/16; H04W 24/02; H04W 40/06; H04W 40/20; H04W 40/242
See application file for complete search history.

(56) References Cited

U.S. PATENT DOCUMENTS

| 9,124,537 B2 | 9/2015 | Kolze |
| 9,246,762 B1 | 1/2016 | Watkins |

(Continued)

FOREIGN PATENT DOCUMENTS

| CN | 101366311 A | 2/2009 |
| CN | 101512971 A | 8/2009 |

(Continued)

OTHER PUBLICATIONS

"3rd Generation Partnership Project; Technical Specification Group Core Network and Terminals; Numbering, addressing and identification; (Release 17)," 3GPP TS 23.003, V17.3.0, pp. 1-145 (Sep. 2021).

(Continued)

*Primary Examiner* — Jamal Javaid
(74) *Attorney, Agent, or Firm* — Jenkins, Taylor & Hunt, P.A.

(57) ABSTRACT

A method for optimized routing of service based interface (SBI) request messages to remote network function (NF) repository functions (NRFs) using indirect communications via a service communication proxy (SCP) includes, at an SCP including at least one processor, receiving an SBI request message. The method further includes forwarding the SBI request message to a remote NRF. The method further includes determining that the remote NRF is unable to process the SBI request message, and, in response to determining that the remote NRF is unable, identifying a georedundant mate of the remote NRF. The method further includes forwarding the SBI request message to the georedundant mate NRF of the remote NRF that is unable to process the SBI request message.

18 Claims, 9 Drawing Sheets

(51) Int. Cl.
*H04W 40/06* (2009.01)
*H04W 40/20* (2009.01)
*H04W 40/24* (2009.01)

(56) References Cited

U.S. PATENT DOCUMENTS

| | | |
|---|---|---|
| 10,299,128 B1 | 5/2019 | Suthar et al. |
| 10,361,843 B1 | 7/2019 | Suthar et al. |
| 10,595,256 B1 | 3/2020 | Marupaduga et al. |
| 10,609,154 B2 | 3/2020 | Talebi Fard et al. |
| 10,609,530 B1 | 3/2020 | Patil et al. |
| 10,616,934 B2 | 4/2020 | Talebi Fard et al. |
| 10,637,753 B1 | 4/2020 | Taft et al. |
| 10,772,062 B1 | 9/2020 | Albasheir et al. |
| 10,778,527 B2 | 9/2020 | Assali et al. |
| 10,791,044 B1 | 9/2020 | Krishan et al. |
| 10,819,636 B1 | 10/2020 | Goel |
| 10,833,938 B1 | 11/2020 | Rajput et al. |
| 10,939,370 B2 | 3/2021 | Baek et al. |
| 11,082,393 B2 | 8/2021 | Goel |
| 11,224,009 B2 | 1/2022 | Krishan |
| 11,290,549 B2 | 3/2022 | Krishan |
| 11,438,828 B2 | 9/2022 | Sapra et al. |
| 11,470,544 B2 | 10/2022 | Singh et al. |
| 11,483,694 B2 | 10/2022 | Krishan |
| 11,589,298 B2 | 2/2023 | Sapra et al. |
| 2005/0193096 A1 | 9/2005 | Yu et al. |
| 2006/0010224 A1 | 1/2006 | Sekar et al. |
| 2007/0050331 A1 | 3/2007 | Bauman et al. |
| 2009/0222584 A1 | 9/2009 | Josefsberg et al. |
| 2013/0029708 A1 | 1/2013 | Fox et al. |
| 2013/0080641 A1 | 3/2013 | Lui et al. |
| 2013/0198269 A1 | 8/2013 | Fleischman et al. |
| 2013/0272123 A1 | 10/2013 | Lee et al. |
| 2014/0349694 A1* | 11/2014 | Raghothaman ....... H04W 76/14 455/509 |
| 2015/0119101 A1 | 4/2015 | Cui et al. |
| 2016/0156513 A1 | 6/2016 | Zhang et al. |
| 2016/0350683 A1 | 12/2016 | Bester et al. |
| 2016/0352588 A1 | 12/2016 | Subbarayan et al. |
| 2016/0380906 A1 | 12/2016 | Hodique et al. |
| 2017/0221015 A1 | 8/2017 | June et al. |
| 2018/0213391 A1 | 7/2018 | Inoue |
| 2018/0262625 A1 | 9/2018 | McCarley et al. |
| 2018/0285794 A1 | 10/2018 | Gray-Donald et al. |
| 2018/0324247 A1 | 11/2018 | Hood et al. |
| 2018/0324646 A1 | 11/2018 | Lee et al. |
| 2018/0343567 A1 | 11/2018 | Ashrafi |
| 2019/0007366 A1 | 1/2019 | Voegele et al. |
| 2019/0045351 A1 | 2/2019 | Zee et al. |
| 2019/0075552 A1 | 3/2019 | Yu et al. |
| 2019/0116486 A1 | 4/2019 | Kim et al. |
| 2019/0116521 A1 | 4/2019 | Qiao et al. |
| 2019/0140895 A1 | 5/2019 | Ennis, Jr. et al. |
| 2019/0158364 A1 | 5/2019 | Zhang et al. |
| 2019/0173740 A1 | 6/2019 | Zhang et al. |
| 2019/0174561 A1 | 6/2019 | Sivakaeesar |
| 2019/0182875 A1 | 6/2019 | Talebi Fard et al. |
| 2019/0191348 A1 | 6/2019 | Futaki et al. |
| 2019/0191467 A1 | 6/2019 | Dao et al. |
| 2019/0212802 A1 | 7/2019 | Srinivasan et al. |
| 2019/0222633 A1 | 7/2019 | Howes et al. |
| 2019/0223093 A1 | 7/2019 | Watfa et al. |
| 2019/0230556 A1 | 7/2019 | Lee |
| 2019/0261244 A1 | 8/2019 | Jung et al. |
| 2019/0306907 A1 | 10/2019 | Andreoli-Fang et al. |
| 2019/0313236 A1 | 10/2019 | Lee et al. |
| 2019/0313437 A1 | 10/2019 | Jung et al. |
| 2019/0313469 A1 | 10/2019 | Karampatsis et al. |
| 2019/0335002 A1 | 10/2019 | Bogineni et al. |
| 2019/0335534 A1 | 10/2019 | Atarius et al. |
| 2019/0342229 A1 | 11/2019 | Ara et al. |
| 2019/0342921 A1 | 11/2019 | Loehr et al. |
| 2019/0349901 A1 | 11/2019 | Basu Mallick et al. |
| 2019/0357092 A1 | 11/2019 | Jung et al. |
| 2019/0357216 A1 | 11/2019 | Jung et al. |
| 2019/0370028 A1 | 12/2019 | Shi et al. |
| 2019/0380031 A1 | 12/2019 | Suthar et al. |
| 2019/0394284 A1 | 12/2019 | Baghel et al. |
| 2019/0394624 A1 | 12/2019 | Karampatsis et al. |
| 2019/0394833 A1 | 12/2019 | Talebi Fard et al. |
| 2020/0008069 A1 | 1/2020 | Zhu et al. |
| 2020/0045753 A1 | 2/2020 | Dao et al. |
| 2020/0045767 A1 | 2/2020 | Velev et al. |
| 2020/0053670 A1 | 2/2020 | Jung et al. |
| 2020/0053724 A1 | 2/2020 | MolavianJazi et al. |
| 2020/0053828 A1 | 2/2020 | Bharatia et al. |
| 2020/0059420 A1 | 2/2020 | Abraham |
| 2020/0059856 A1 | 2/2020 | Cui et al. |
| 2020/0084663 A1 | 3/2020 | Park et al. |
| 2020/0092423 A1 | 3/2020 | Qiao et al. |
| 2020/0092424 A1 | 3/2020 | Qiao et al. |
| 2020/0127916 A1 | 4/2020 | Krishan |
| 2020/0136911 A1 | 4/2020 | Assali et al. |
| 2020/0137174 A1 | 4/2020 | Stammers et al. |
| 2020/0404608 A1 | 12/2020 | Albasheir et al. |
| 2021/0007023 A1 | 1/2021 | Umapathy et al. |
| 2021/0044481 A1 | 2/2021 | Xu et al. |
| 2021/0067485 A1 | 3/2021 | Goel |
| 2021/0112443 A1 | 4/2021 | Krishan et al. |
| 2021/0204200 A1 | 7/2021 | Krishan et al. |
| 2021/0297935 A1 | 9/2021 | Belling et al. |
| 2021/0385286 A1 | 12/2021 | Wang et al. |
| 2021/0392197 A1 | 12/2021 | Yang et al. |
| 2022/0015023 A1 | 1/2022 | De-Gregorio-Rodriguez et al. |
| 2022/0038999 A1 | 2/2022 | Sapra et al. |
| 2022/0060547 A1 | 2/2022 | Krishan |
| 2022/0070648 A1 | 3/2022 | Krishan |
| 2022/0240171 A1 | 7/2022 | Singh |
| 2022/0286949 A1 | 9/2022 | Sapra et al. |
| 2023/0007536 A1 | 1/2023 | Sharma |
| 2023/0099468 A1 | 3/2023 | Khare et al. |
| 2023/0188972 A1 | 6/2023 | Goel et al. |

FOREIGN PATENT DOCUMENTS

| | | |
|---|---|---|
| CN | 105814931 A | 7/2016 |
| CN | 114930902 A | 8/2022 |
| CN | ZL201980067968.7 | 9/2022 |
| CN | 2020800910053 | 5/2023 |
| KR | 20190057818 A | 5/2019 |
| WO | WO 2018/174021 A1 | 9/2018 |
| WO | WO 2018/174516 A1 | 9/2018 |
| WO | WO 2019/034609 A1 | 2/2019 |
| WO | WO 2019/193129 A1 | 10/2019 |
| WO | WO 2019/220172 A1 | 11/2019 |
| WO | WO 2020/002507 A1 | 1/2020 |
| WO | WO 2020/091934 A1 | 5/2020 |
| WO | WO 2021/138074 A1 | 7/2021 |
| WO | WO 2022/025988 A1 | 2/2022 |
| WO | WO 2022/046170 A1 | 3/2022 |
| WO | WO 2022/050987 A1 | 3/2022 |

OTHER PUBLICATIONS

Ex Parte Quayle Action for U.S. Appl. No. 16/942,713 (filed Sep. 13, 2021).

Commonly-Assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)," (Unpublished, filed Oct. 8, 2021).

Notification of Transmittal of the International Search Report and the Written Opinion of the International Searching Authority, or the Declaration for U.S. Patent Application Serial No. PCT/US2021/020122 (dated Jun. 1, 2021).

"3rd Generation Partnership Project; Technical Specification Group Core Network and Terminals; 5G System; Network Function Repository Services; Stage 3 (Release 17)," 3GPP TS 29.510, V17.2.0, pp. 1-256 (Jun. 2021).

(56) References Cited

OTHER PUBLICATIONS

Notification of Transmittal of the International Search Report and the Written Opinion of the International Searching Authority, or the Declaration for U.S. Patent Application Serial No. PCT/US2021/020121 (dated Jun. 1, 2021).
Notice of Allowance and Fee(s) Due for U.S. Appl. No. 17/001,599 (dated May 17, 2021).
Applicant-Initiated Interview Summary for U.S. Appl. No. 17/001,599 (dated May 5, 2021).
Commonly-Assigned, co-pending U.S. Appl. No. 17/193,337 for "Methods, Systems, and Computer Readable Media for Selecting Multiple Network Function Types Using a Single Discovery Request," (Unpublished, filed Mar. 5, 2021).
"3rd Generation Partnership Project; Technical Specification Group Services and System Aspects; Procedures for the 5G System (5GS); Stage 2 (Release 16)," 3GPP TS 23.502, V16.7.0, pp. 1-603 (Dec. 2020).
"3rd Generation Partnership Project; Technical Specification Group Services and System Aspects; System architecture for the 5G System (5GS); Stage 2 (Release 16)," 3GPP TS 23.501, V16.7.0, pp. 1-450 (Dec. 2020).
"3rd Generation Partnership Project; Technical Specification Group Core Network and Terminals; 5G System; Network Function Repository Services; Stage 3 (Release 17)," 3GPP TS 29.510, V17.0.0, pp. 1-245 (Dec. 2020).
"3rd Generation Partnership Project; Technical Specification Group Core Network and Terminals; 5G System; Technical Realization of Service Based Architecture; Stage 3 (Release 17)," 3GPP TS 29.500, V17.1.0, pp. 1-90 (Dec. 2020).
Commonly-assigned, co-pending U.S. Appl. No. 17/009,725 for "Methods, Systems, and Computer Readable Media for Service Communications Proxy (SCP)-Specific Prioritized Network Function (NF) Discovery and Routing," (Unpublished, filed Sep. 1, 2020).
Commonly-Assigned, co-pending U.S. Appl. No. 17/001,599 for "Methods, Systems, and Computer Readable Media for Optimized Network Function (NF) Discovery and Routing Using Service Communications Proxy (SCP) and NF Repository Function (NRF)," (Unpublished, filed Aug. 24, 2020).
"3rd Generation Partnership Project; Technical Specification Group Services and System Aspects; System architecture for the 5G System (5GS); Stage 2 (Release 16)," 3GPP Ts 23.501 V16.5.1, pp. 1-440 (Aug. 2020).
Commonly-Assigned, co-pending U.S. Appl. No. 16/942,713 for "Methods, Systems, and Computer Readable Media for Providing Network Function Discovery Service Enhancements," (Unpublished, filed Jul. 29, 2020).
"3rd Generation Partnership Project; Technical Specification Group Core Network and Terminals; 5G System; Network Function Repository Services; Stage 3 (Release 16)," 3GPP Ts 29.510 V16.4.0, pp. 1-192 (Jul. 2020).
"3rd Generation Partnership Project; Technical Specification Group Services and System Aspects; Procedures for the 5G System (5GS); Stage 2 (Release 16)," 3GPP Ts 23.502, V16.5.0, pp. 1-594 (Jul. 2020).
"3rd Generation Partnership Project; Technical Specification Group Services and System Aspects; System architecture for the 5G System (5GS); Stage 2 (Release 16)," 3GPP Ts 23.501, V16.5.0, pp. 1-441 (Jul. 2020).
"3rd Generation Partnership Project; Technical Specification Group Core Network and Terminals; 5G System; Technical Realization of Service Based Architecture; Stage 3 (Release 16)," 3GPP Ts 29.500 V16.4.0 pp. 1-79 (Jun. 2020).
"3rd Generation Partnership Project; Technical Specification Group Services and System Aspects; Procedures for the 5G System (5GS); Stage 2," 3GPP Ts 23.502 V16.4.0 pp. 1-582 (Mar. 2020).
"3rd Generation Partnership Project; Technical Specification Group Core Network and Terminals; 5G System; Network Function Repository Services; Stage 3 (Release 16)," 3GPP Ts 29.510, V16.0.0, pp. 1-135 (Jun. 2019).

Huawei, "eSBA: reselection of producer instance," 3GPP TSG-SA2 Meeting #132, pp. 1-2 (Apr. 12, 2019).
Docomo, "Update Solution 4 for implicit registration," Sa WG2 Meeting #129, pp. 1-2 (Oct. 15-19, 2018).
Notice of Allowance and Fee(s) Due for U.S. Appl. No. 16/356,446 (Sep. 30, 2021).
Notice of Allowance and Fee(s) Due for U.S. Appl. No. 16/730,799 (Aug. 16, 2021).
Communication of European publication No. and information on the application of Article 67(3) EPC for European Patent Application Serial No. 19791391.6 (Aug. 11, 2021).
Notice of Allowance and Fee(s) Due for U.S. Appl. No. 16/730,799 (Jul. 30, 2021).
Notification of Transmittal of the International Search Report and the Written Opinion of the International Searching Authority, or the Declaration for International Application No. PCT/US2021/024000 (dated Jun. 24, 2021).
Non-Final Office Action for U.S. Appl. No. 16/356,446 (dated Jun. 16, 2021).
Notification of Transmittal of the International Search Report and the Written Opinion of the International Searching Authority, or the Declaration for International Application Serial No. PCT/US2020/065765 (dated Apr. 15, 2021).
Ex Parte Quayle Action for U.S. Appl. No. 16/730,799 (filed Apr. 7, 2021).
Advisory Action for U.S. Appl. No. 16/356,446 (dated Dec. 22, 2020).
Notice of Allowance and Fee(s) Due for U.S. Appl. No. 16/555,817 (dated Dec. 3, 2020).
Commonly-Assigned, co-pending U.S. Appl. No. 17/156,149 for "Methods, Systems, and Computer Readable Media for Optimized Routing of Messages Relating to Existing Network Function (NF) Subscriptions Using an Intermediate Forwarding NF Repository Function (NRF)," (Unpublished, filed Nov. 9, 2020).
Final Office Action for U.S. Appl. No. 16/356,446 (dated Sep. 8, 2020).
Non-Final Office Action for U.S. Appl. No. 16/356,446 (dated May 11, 2020).
Notice of Allowance and Fee(s) Due for U.S. Appl. No. 16/176,920 (dated Apr. 16, 2020).
Applicant-Initiated Interview Summary for U.S. Appl. No. 16/176,920 (dated Apr. 1, 2020).
Non-Final Office Action for U.S. Appl. No. 16/176,920 (dated Mar. 6, 2020).
Notification of Transmittal of the International Search Report and the Written Opinion of the International Searching Authority, or the Declaration for International Application Serial No. PCT/US2019/053912 (dated Dec. 18, 2019).
"5G; System architecture for the 5G System (5GS) (3GPP TS 23.501 version 15.6.0 Release 15)," ETSI TS 123 501, V15.6.0, pp. 1-168 (Oct. 2019).
"5G; 5G System; Network function repository services; Stage 3 (3GPP TS 29.510 version 15.5.1 Release 15)," ETSI TS 129 510, V15.5.1, pp. 1-132 (Oct. 2019).
"3rd Generation Partnership Project; Technical Specification Group Core Network and Terminals; 5G Systems; Network Function Repository Services; Stage 3 (Release 16)," 3GPP TS 29.510 V.16.1.1, pp. 1-150 (Oct. 2019).
"3rd Generation Partnership Project; Technical Specification Group Core Network and Terminals; 5G System; Technical Realization of Service Based Architecture; Stage 3 (Release 16)," 3GPP TS 29.500 V16.1.0, pp. 1-43 (Sep. 2019).
"3rd Generation Partnership Project; Technical Specification Group Service and System Aspects; System Architecture for the 5G System (5GS); Stage 2 (Release 16)," 3GPP TS 23.501 V16.2.0, pp. 1-391 (Sep. 2019).
"5G; 5G System; Technical Realization of Service Based Architecture; Stage 3 (3GPP TS 29.500 version 15.5.0 Release 15)," ETSI TS 129 500, V15.5.0, pp. 1-40 (Sep. 2019).
Commonly-Assigned, co-pending U.S. Appl. No. 16/356,446 for "Methods, Systems, And Computer Readable Media For Locality-Based Selection And Routing Of Traffic To Producer Network Functions (NFs)," (Unpublished, filed Mar. 18, 2019).

(56) References Cited

OTHER PUBLICATIONS

Commonly-Assigned, co-pending U.S. Appl. No. 16/176,920 for "Methods, Systems, and Computer Readable Media for Providing a Service Proxy Function in a Telecommunications Network Core Using a Service-Based Architecture," (Unpublished, filed Oct. 31, 2018).
"3rd Generation Partnership Project; Technical Specification Group Services and System Aspects; Study on Enhancements to the Service-Based Architecture (Release 16)," 3GPP TR 23.742, V0.3.0, pp. 1-64 (Jul. 2018).
"3rd Generation Partnership Project; Technical Specification Group Services and System Aspects; Study on Enhancements to the Service-Based Architecture (Release 16)," 3GPP TR 23.742, V0.2.0, pp. 1-39 (Jun. 2018).
"5G; Procedures for the 5G System (3GPP TS 23.502 version 15.2.0 Release 15)," ETSI TS 123 502 V15.2.0, pp. 1-46 (Jun. 2018).
Scholl et al., "An API First Approach to Microservices Development," Oracle, https://blogs.oracle.com/developers/an-api-first-approach-to-microservices-development, pp. 1-12 (Nov. 8, 2017).
"Pseudo-CR on Service Discovery and Registration using NRF service," Ericsson, 3GPP TSG CT4 Meeting #79, 3GPP TR 29.891-v0.3.0, pp. 1-4 (Aug. 21-25, 2017).
Nichols et al., "Definition of the Differentiated Services Field (DS Field) in the IPv4 and IPv6 Headers," Internet Engineering Task Force (IETF) Network Working Group Request for Comments (RFC) 2474, The Internet Society, pp. 1-20 (Dec. 1998).
"3rd Generation Partnership Project; Technical Specification Group Core Network and Terminals; 5G System; Technical Realization of Service Based Architecture; Stage 3 (Release 17)," 3GPP TS 29.500, V17.2.0, pp. 1-100 (Mar. 2021).
Notice of Allowance and Fee(s) Due for U.S. Appl. No. 17/193,337 (dated Oct. 12, 2022).
Applicant-Initiated Interview Summary for U.S. Appl. No. 17/193,337 (dated Sep. 7, 2022).
Notice of Allowance and Fee(s) Due for U.S. Appl. No. 17/009,725 (dated Jun. 13, 2022).
Commonly-Assigned, co-pending U.S. Appl. No. 17/746,895 for Methods, Systems, and Computer Readable Media for Facilitating Processing of Inter-Public Land Mobile Network (PLMN) Messages Related to Existing Subscriptions,' (Unpublished, filed May 17, 2022).
"3rd Generation Partnership Project; Technical Specification Group Core Network and Terminals; 5G System; Network Function Repository Services; Stage 3 (Release 17)," 3GPP TS 29.510, V17.5.0, pp. 1-298 (Mar. 2022).
Notice of Allowance for U.S. Appl. No. 17/156,149 (dated May 24, 2022).
Non-Final Office Action for U.S. Appl. No. 17/193,337 (dated May 11, 2022).
Notice of Allowance for U.S. Appl. No. 17/156,149 (dated Apr. 19, 2022).
Commonly-Assigned, co-pending U.S. Appl. No. 17/551,124 for "Methods, Systems, and Computer Readable Media for Enabling Forwarding of Subsequent Network Function Subscription Updates," (Unpublished, filed Dec. 14, 2021).
Communication of European Publication Number and Information on the Application of Article 67(3) EPC for European Patent Application Serial No. 20842464.8 (dated Oct. 12, 2022).
First Examination Report for Indian Patent Application Serial No. 20224703624 (dated Nov. 17, 2022).
Notification to Grant Patent Right for Chinese Patent Application Serial No. 201980067968.7 (dated Aug. 25, 2022).
Notice of Allowance for U.S. Appl. No. 17/009,725 (dated Jun. 13, 2022).
Non-Final Office Action for Chinese Patent Application Serial No. 201980067968.7 (dated Mar. 3, 2022).
First Examination Report for Indian Patent Application Serial No. 202147011137 (dated Mar. 9, 2022).
Non-Final Office Action for U.S. Appl. No. 17/082,871 (dated Feb. 7, 2022).
Commonly-Assigned, co-pending U.S. Appl. No. 17/497,879 for "Methods, Systems, and Computer Readable Media for Routing Inter-Public Land Mobile Network (Inter-PLMN) Messages Related to Existing Subscriptions with Network Function (NF) Repository Function (NRF) Using Security Edge Protection Proxy (SEPP)" (Unpublished, filed Oct. 21, 2021).
Notice of Allowance and Fee(s) Due for U.S. Appl. No. 16/942,713 (dated Nov. 29, 2021).
Notice of Allowance and Fee(s) Due for U.S. Appl. No. 17/001,599 (dated Nov. 17, 2021).
"Implementing Quality of Service Policies with DSCP," Cisco, pp. 1-7 (Feb. 15, 2008).
Examination Report for Indian Patent Application No. IN 202247064258 (dated May 18, 2023).
Notice of Publication for European Patent Application No. 21715008.5 (dated May 10, 2023).
Notice of Publication for European Patent Application No. 21718460.5 (dated Jun. 14, 2023).
Notice of Publication for European Patent Application No. 21714723.0 (dated Jun. 1, 2023).
Intent to Grant for Japanese Patent Application No. 2021-523374 (dated Jun. 27, 2023).
Office Action for Japanese Application No. 2021-523374 dated Mar. 14, 2023.
Notification to Grant Patent Rights for Chinese Patent Application Serial No. 202080091005.3 (dated Feb. 25, 2023).
First Examination Report for European Patent Application Serial No. 19 791 391.6 1213 (dated Dec. 16, 2022).
Office Action for Japanese Patent Application No. 2021-523374 dated Mar. 14, 2023.
Intent to Grant for European Patent Application Serial No. 20842464.8 (dated Oct. 19, 2023).
First Office Action for Chinese Patent Application Serial No. 202180052441.4 (dated Aug. 30, 2023).
Notice of Allowance for U.S. Appl. No. 17/497,879 (dated Jul. 26, 2023).
Office Action for Chinese Patent Application Serial No. 202180068287.X (dated Sep. 28, 2023).
Notice of Allowance for U.S. Appl. No. 17/551,124 (dated Oct. 12, 2023).

* cited by examiner

… (1)
METHODS, SYSTEMS, AND COMPUTER READABLE MEDIA FOR OPTIMIZED ROUTING OF SERVICE BASED INTERFACE (SBI) REQUEST MESSAGES TO REMOTE NETWORK FUNCTION (NF) REPOSITORY FUNCTIONS USING INDIRECT COMMUNICATIONS VIA SERVICE COMMUNICATION PROXY (SCP)

TECHNICAL FIELD

The subject matter described herein relates to routing SBI request messages to remote NRFs. More particularly, the subject matter described herein relates to methods, systems, and computer readable media for optimized routing of SBI request messages to a remote NRF using indirect communications via an SCP.

BACKGROUND

In 5G telecommunications networks, a network function that provides service is referred to as a producer network function (NF) or NF service producer. A network function that consumes services is referred to as a consumer NF or NF service consumer. A network function can be a producer NF, a consumer NF, or both, depending on whether the network function is consuming, producing, or consuming and producing a service. The terms "producer NF" and "NF service producer" are used interchangeably herein. Similarly, the terms "consumer NF" and "NF service consumer" are used interchangeably herein.

A given producer NF may have many service endpoints, where a service endpoint is the point of contact for one or more NF instances hosted by the producer NF. The service endpoint is identified by a combination of Internet protocol (IP) address and port number or a fully qualified domain name that resolves to an IP address and port number on a network node that hosts a producer NF. An NF instance is an instance of a producer NF that provides a service. A given producer NF may include more than one NF instance. It should also be noted that multiple NF instances can share the same service endpoint.

Producer NFs register with a network function repository function (NRF). The NRF maintains service profiles of available NF instances identifying the services supported by each NF instance. The terms "service profiles" and "NF profiles" are used interchangeably herein. Consumer NFs can subscribe to receive information about producer NF instances that have registered with the NRF.

In addition to consumer NFs, another type of network node that can subscribe to receive information about NF service instances is a service communication proxy (SCP). The SCP subscribes with the NRF and obtains reachability and service profile information regarding producer NF service instances. Consumer NFs connect to the SCP, and the SCP load balances traffic among producer NF service instances that provide the required service or directly routes the traffic to the destination producer NF instance.

In addition to the SCP, other examples of intermediate proxy nodes or groups of network nodes that route traffic between producer and consumer NFs include the security edge protection proxy (SEPP), the service gateway, and nodes in the 5G service mesh. The SEPP is the network node used to protect control plane traffic that is exchanged between different 5G public land mobile networks (PLMNs). As such, the SEPP performs message filtering, policing and topology hiding for all application programming interface (API) messages that are transmitted between PLMNs.

One problem in 5G communications networks occurs when NRFs are deployed in a georedundant manner, a consumer NF that creates a subscription with a remote NRF that fails or returns an error response, and the consumer NF cannot contact the mate of the remote NRF because the consumer NF does not know about the mate of the remote NRF. For example, if a consumer NF sends a create subscription request to an NRF located at site 1, and the NRF at site 1 does not have NF profile information for the producer NF instance identified in the subscription request, the NRF at site 1 will forward the subscription request to another NRF, which may be located at another site, which will be referred to as site 2. The subscription is created when the NRF at site 2 accepts the request and forwards the notification of the acceptance to the consumer NF. The consumer NF then communicates directly with the NRF at site 2 for subsequent messages relating to the subscription, such as messages to modify or delete the subscription. If the NRF at site 2 fails and its processing is taken over by a georedundant mate NRF at site 2, the consumer NF will not be able to contact the mate remote NRF to modify or delete the subscription, because the consumer NF does not have knowledge of the mate remote NRF.

In general, for SBI request messages that request service from a remote NRF, consumer NFs are not likely to be provisioned with remote NRF topology information. As are result, if a remote NRF fails to respond to an SBI request message from a consumer NF, the consumer NF will not be able to contact a georedundant mate of the remote NRF.

Accordingly, there exists a need for methods, systems, and computer readable media for optimized routing of SBI request messages to remote NRFs that avoids at least some of these difficulties.

SUMMARY

A method for routing service based interface (SBI) request messages to remote network functions (NFs) repository function (NRF) using indirect communications via a service proxy (SCP) includes, at an SCP including at least one processor, receiving an SBI request message. The method includes forwarding the SBI request message to a remote NRF. The method further includes determining that the remote NRF is unable to process the SBI request message. The method further includes, in response to determining that the remote NRF is unable to process the SBI request message, identifying a georedundant mate of the remote NRF. The method further includes forwarding the SBI request message to the georedundant mate NRF of the remote NRF that is unable to process the SBI request message.

According to another aspect of the subject matter described herein, receiving an SBI request message includes receiving an SBI request message associated with an existing subscription with the remote NRF.

According to another aspect of the subject matter described herein, receiving an SBI request message associated with an existing subscription includes receiving a request to update or delete the existing subscription.

According to another aspect of the subject matter described herein, determining that the remote NRF is unable to process the SBI request message includes determining that the remote NRF is unable to process the SBI request message in response to failing to receive a response to the SBI request message within a configurable timeout period or receiving an error response with a configured hypertext transfer protocol (HTTP) status code for alternate routing to a mate NRF.

According to another aspect of the subject matter described herein, the method for optimized routing of SBI request messages to remote NRFs includes maintaining, at the SCP, an NRF topology database including NRF topology information.

According to another aspect of the subject matter described herein, identifying the georedundant mate of the remote NRF includes performing a lookup in the NRF topology database, locating a record corresponding to an NRF set of which the remote NRF is a member, and extracting an identity of the georedundant mate from the record.

According to another aspect of the subject matter described herein, maintaining the NRF topology database includes populating the NRF topology database with NRF topology information configured by a network operator.

According to another aspect of the subject matter described herein, the method for optimized routing of SBI request messages to remote NRFs using indirect communications via an SCP includes learning the NRF topology information and maintaining the NRF topology database comprises populating the NRF topology database with the learned NRF topology information.

According to another aspect of the subject matter described herein, learning the NRF topology information includes receiving the NRF topology information from an NRF at a higher level in an NRF hierarchy than the remote NRF.

According to another aspect of the subject matter described herein, the method for optimized routing of messages to remote NRFs using indirect communications via an SCP includes modifying an apiRoot attribute in the SBI request message to identify the georedundant mate of the remote NRF prior to forwarding the SBI request message to the georedundant mate of the remote NRF.

According to another aspect of the subject matter described herein, a system for optimized routing of service based interface (SBI) request messages to a remote network function (NF) repository function (NRFs) using indirect communications via a service communication proxy (SCP) is provided. The system includes an SCP including at least one processor. The system further includes an SBI message router implemented by the at least one processor for receiving an SBI request message, forwarding the SBI request message to a remote NRF, determining that the remote NRF is unable to process the SBI request message, in response to determining that the remote NRF is unable to process the SBI request message, identifying a georedundant mate of the remote NRF, and forwarding the SBI request message to the georedundant mate NRF of the remote NRF that is unable to process the SBI request message.

According to another aspect of the subject matter described herein, the SBI request message is associated with an existing subscription with the remote NRF.

According to another aspect of the subject matter described herein, the SBI request message comprises a request to update or delete the existing subscription.

According to another aspect of the subject matter described herein, the SBI message router is configured to determine that the remote NRF is unable to process the SBI request message in response to failing to receive a response to the SBI request message within a configurable timeout period or receiving an error response with a configured hypertext transfer protocol (HTTP) status code for alternate routing to a mate NRF.

According to another aspect of the subject matter described herein, the system for optimized routing of SBI request messages to remote NRFs using indirect communications via an SCP includes an NRF topology database located in memory of the SCP and including NRF topology information.

According to another aspect of the subject matter described herein, the SBI message router is configured to identify the georedundant mate of the remote NRF by performing a lookup in the NRF topology database, locating a record corresponding to an NRF set of which the remote NRF is a member, and extracting an identity of the georedundant mate from the record.

According to another aspect of the subject matter described herein, the NRF topology information in the NRF topology database is configured by a network operator.

According to another aspect of the subject matter described herein, the system for optimized routing of SBI request messages to remote NRFs using indirect communications via an SCP includes an NRF topology learner implemented in the SCP for learning the NRF topology information from an NRF at a higher level in an NRF hierarchy than the remote NRF and wherein the NRF topology learner is configured to populate the NRF topology database with the learned NRF topology information.

According to another aspect of the subject matter described herein, the SBI message router is configured to modify an apiRoot attribute in the SBI request message to identify the georedundant mate of the remote NRF prior to forwarding the SBI request message to the georedundant mate of the remote NRF.

According to another aspect of the subject matter described herein, a non-transitory computer readable medium having stored thereon executable instructions that when executed by a processor of a computer control the computer to perform steps is provided. The steps are performed at a service communication proxy (SCP). The steps include receiving a service based interface (SBI) request message. The steps further include forwarding the SBI request message to a remote network function (NF) repository function (NRF). The steps further include determining that the remote NRF is unable to process the SBI request message. The steps further include, in response to determining that the remote NRF is unable to process the SBI request message, identifying a georedundant mate of the remote NRF. The steps further include forwarding the SBI request message to the georedundant mate NRF of the remote NRF that is unable to process the SBI request message.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Exemplary implementations of the subject matter described herein will now be explained with reference to the accompanying drawings, of which.

DETAILED DESCRIPTION

Figure 1:
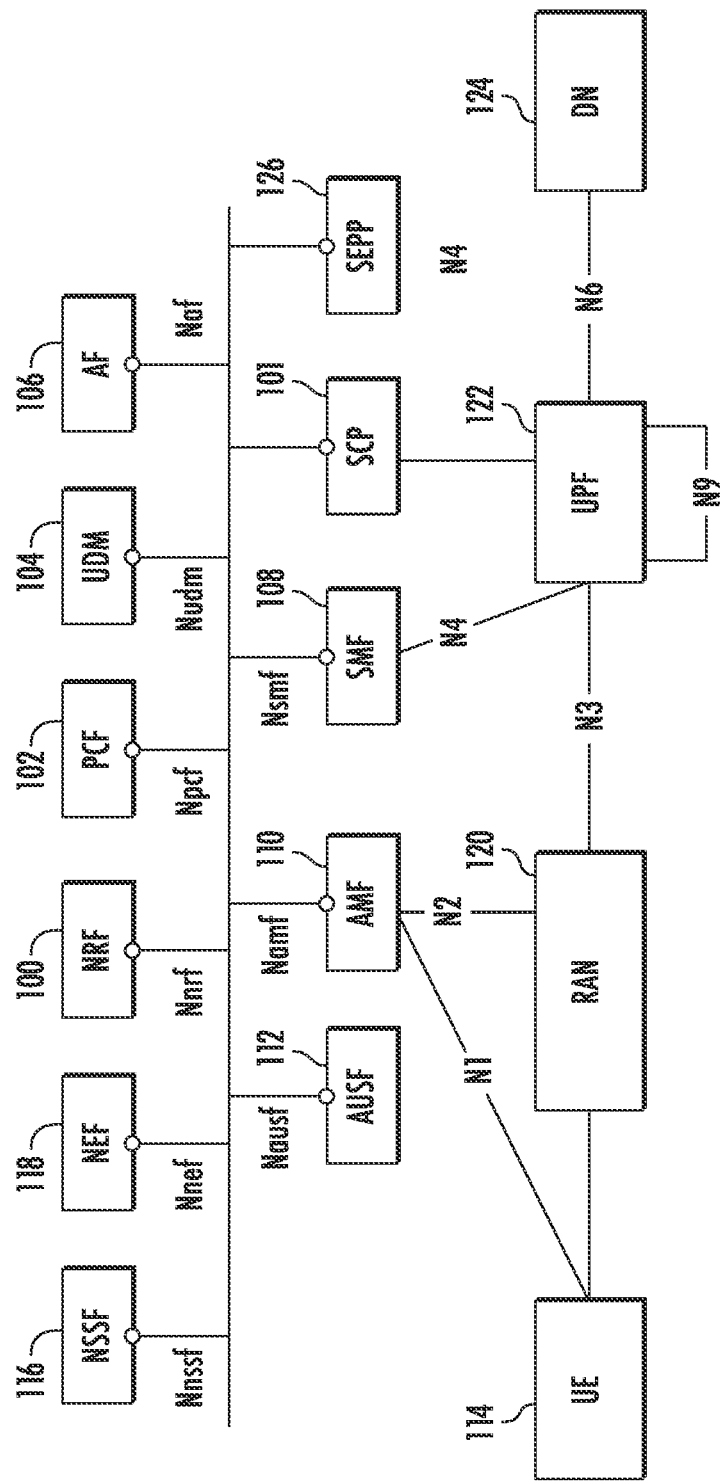
FIG. 1 is a network diagram illustrating an exemplary 5G system network architecture.

FIG. 1 is a block diagram illustrating an exemplary 5G system network architecture. The architecture in FIG. 1 includes NRF 100 and SCP 101, which may be located in the same home public land mobile network (HPLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs.

NRF 100 is a repository for NF or service profiles of producer NF instances. In order to communicate with a producer NF instance, a consumer NF or an SCP must obtain the NF or service profile of the producer NF instance from NRF 100. The NF or service profile is a JavaScript object notation (JSON) data structure defined in Third Generation Partnership Project (3GPP) Technical Specification (TS) 29.510. The NF or service profile definition includes at least one of a fully qualified domain name (FQDN), an Internet protocol (IP) version 4 (IPv4) address or an IP version 6 (IPv6) address.

In FIG. 1, any of the network functions can be consumer NFs producer NFs, or both, depending on whether they are requesting, providing, or requesting and providing services. In the illustrated example, the NFs include a policy control function (PCF) 102 that performs policy related operations in a network, a unified data management (UDM) function 104 that manages user data, and an application function (AF) 106 that provides application services.

The NFs illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user equipment (UEs), such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects user equipment (UE) 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

SEPP 126 filters incoming traffic from another PLMN and performs topology hiding for traffic exiting the home PLMN. SEPP 126 may communicate with an SEPP in a foreign PLMN which manages security for the foreign PLMN. Thus, traffic between NFs in different PLMNs may traverse two SEPP functions, one for the home PLMN and the other for the foreign PLMN.

As described above, one problem with the 3GPP network architecture for 5G networks is that consumer NFs may not be able to contact georedundant mated remote NRFs when the remote NRF with which a subscription was originally created fails.

Figure 2:
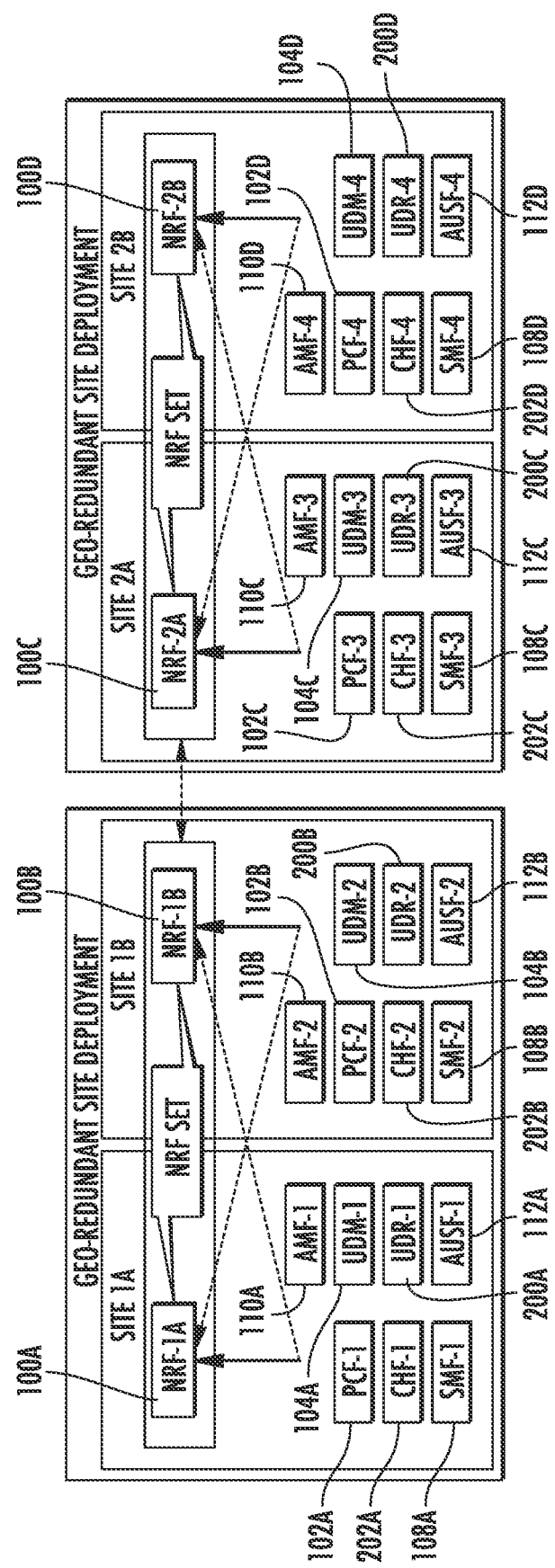
FIG. 2 is a network diagram illustrating an exemplary network architecture with georedundant NRF deployments.

FIG. 2 is a network diagram illustrating an example georedundant deployment of NRFs in a 5G network. In FIG. 2, an operator may deploy mated pairs of NRFs at geographically diverse sites. In the illustrated example, NRFs 100A and 1008 are a first mated pair respectively deployed at sites 1A and 1B, which may be part of the same data center at the same geographic location. NRFs 100A and 1008 share network NF profile information and subscriptions to NF profiles and form an NRF set, which is a logical grouping of NRFs that can provide the same service.

The 5G core network elements described above with regard to FIG. 1 may also be deployed as mated pairs with georedundance. In the example illustrated in FIG. 2 the mated pairs of NFs at sites 1A and 1B include AMFs 110A and 1108, UDMs 104A and 104B, unified data repositories (UDRs) 200A and 200B, AUSFs 112A and 112B, PCFs 102A and 102B, charging functions (CHFs) 202A and 202B, and SMFs 108A and 108B.

Similarly, the network operator may have mated NRFs and other 5G NFs located at a site that is geographically diverse from sites 1A and 1B. In FIG. 2, the georedundant mated NRFs located at sites 2A and 2B include NRFs 100C and 100D, which form a second NRF set. In addition, the other 5G NFs may also be deployed as mated pairs at sites 2A and 2B. In the illustrated example, these include AMFs 110C and 110D, UDMs 104C and 104D, UDRs 200C and 200D, AUSFs 112C and 112D, PCFs 102C and 102D, CHFs 202C and 202D, and SMFs 108C and 108D.

A network operator may have N NRF sets. In FIG. 2, N=2. Georedundant deployments are used to protect against site failures caused by natural disasters, power failures, etc. One problem with georedundant NRF deployments is that consumer NFs need to be aware of all of the NRF instances that are deployed georedundantly, which adds complexity at consumer NFs, increases operational overhead for configuring all NRF instances deployed as georedundant NRFs, and increases security attack surfaces.

In one service operation provided by 3GPP networks, specified in 3GPP TS 29.510 Section 5.2.2.5.4, when multiple NRFs are deployed in a PLMN, an NF instance can subscribe to changes of other NF instances registered with an NRF with which the NF instance is not directly interacting. The subscription message is forwarded by an intermediate forwarding NRF with which the subscribing NF is directly interacting. This scenario is illustrated in FIG. 3.

Figure 3:
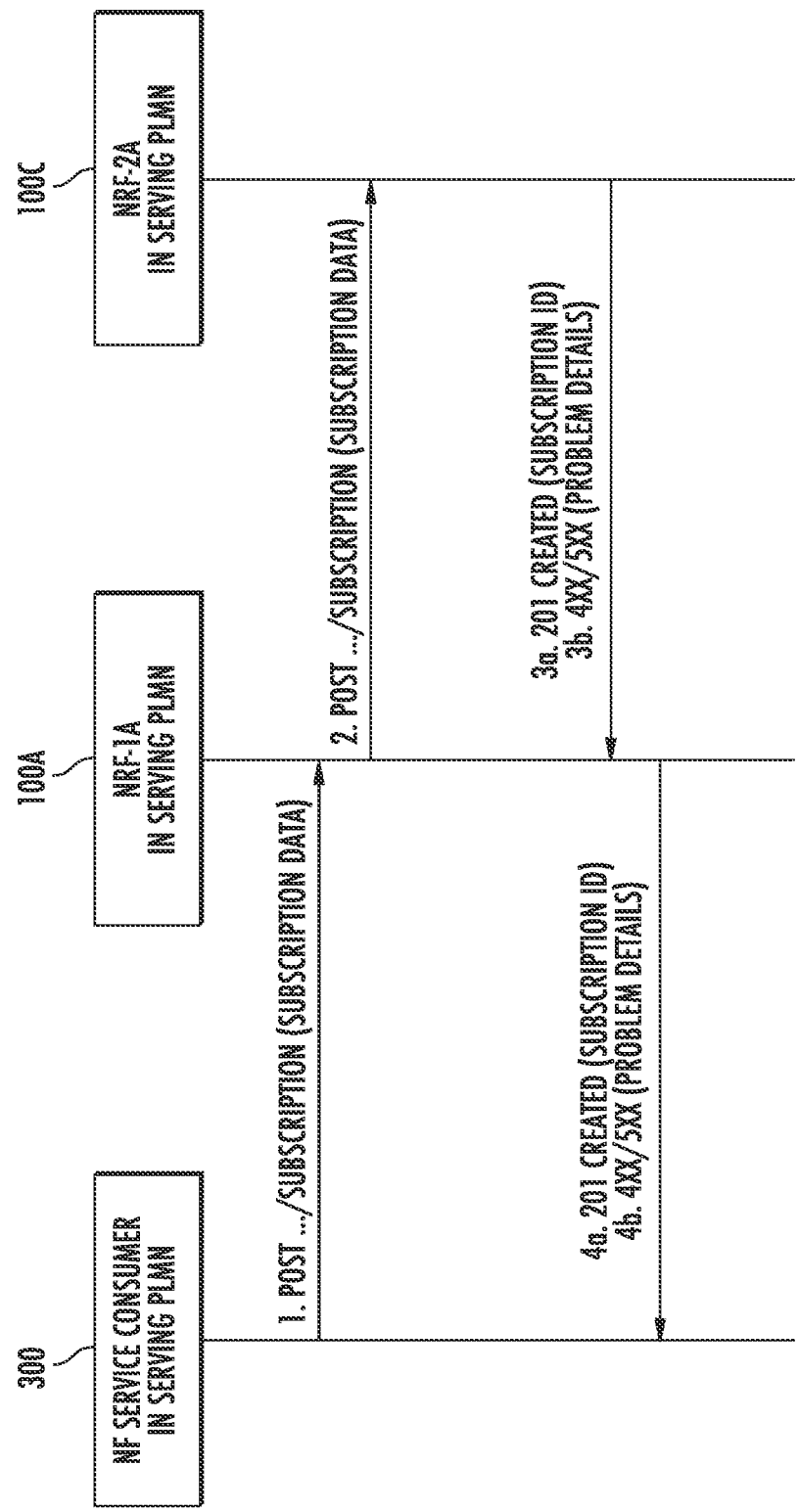
FIG. 3 is a message flow diagram illustrating forwarding of a create subscription request message by an intermediate forwarding NRF.

In FIG. 3, an NF consumer 300 in a serving PLMN interacts directly with NRF 100A but not with NRF 100C. As illustrated in FIG. 2, NRFs 100A and 100C may be located at geographically diverse sites, and consumer NF 300 may not be aware of NRF 100C. Referring to the message flow in FIG. 3, in step 1, consumer NF 300 sends an HTTP POST message carrying a create subscription request to NRF-1A 100A in the serving PLMN. The subscription request may be a request to invoke the NFStatusSubscribe service operation to receive notifications regarding the status of a producer NF. The request includes the SubscriptionData parameter in the request body. NRF-1A 100A receives the subscription request but does not have the NF profile information to fulfill the request. Accordingly, NRF-1A 100A sends the subscription request to a preconfigured NRF, which in the illustrated example is NRF-2A 100C. If NRF-2A 100C determines that it has NF profile information identified in the subscription request, NRF-2A 100C responds, as indicated in step 2a with a 201 Created response message indicating that the subscription has been created and including NF profile information for the NF instance identified in the subscription request. The response contains data related to the created subscription, including the validity time, as determined by the NRF, after which the subscription becomes invalid.

If NRF-2A 100C determines that it does not have the requested subscription data, NRF-2A 100C identifies the next hop NRF and forwards the subscription request to that NRF. The next hop NRF may be selected based on operator-configured parameters, such as priority and/or capacity. The next hop NRF may perform similar operations to NRF-2A 100C. The subscription request may be forwarded to NRFs until the NRF that has the requested subscription data is reached or there are no more NRFs in the service provider's network to contact.

In the illustrated example, it is assumed that NRF-2A 100C either has the requested subscription data or is the last NRF to contact in the service provider's network. If the subscription is successfully created (i.e., NRF-2A 100C has the requested subscription data and accepts the request), control proceeds to step 3a, where NRF-2A 100C returns a 201 Created message to NRF-1A 100A. The 201 Created message indicates that the subscription is successfully created and includes the subscription ID as well as other subscription data, such as validity time. The payload body of the 201 Created message shall contain the representation describing the status of the request and the "Location" header shall be present and shall contain the URI of the created resource. The authority and/or deployment-specific string of the apiRoot of the created resource URI may differ from the authority and/or deployment-specific string of the apiRoot of the request URI received in the POST request.

In step 4a, NRF-1 100A forwards the 201 Created message to consumer NF 300. After receiving the 201 Created message, consumer NF 300 corresponds directly with NRF-2 100-C.

If the subscription request fails (i.e., because NRF-2A 100C does not have the requested subscription data and is the last hop NRF in the network), control proceeds to step 3b where NRF-2A 100C returns a 4XX or 5XX message to NRF-1A 100A. In step 4b, NRF-1A 100A forwards the 4XX or 5XX error message to consumer NF 300.

Figure 4:
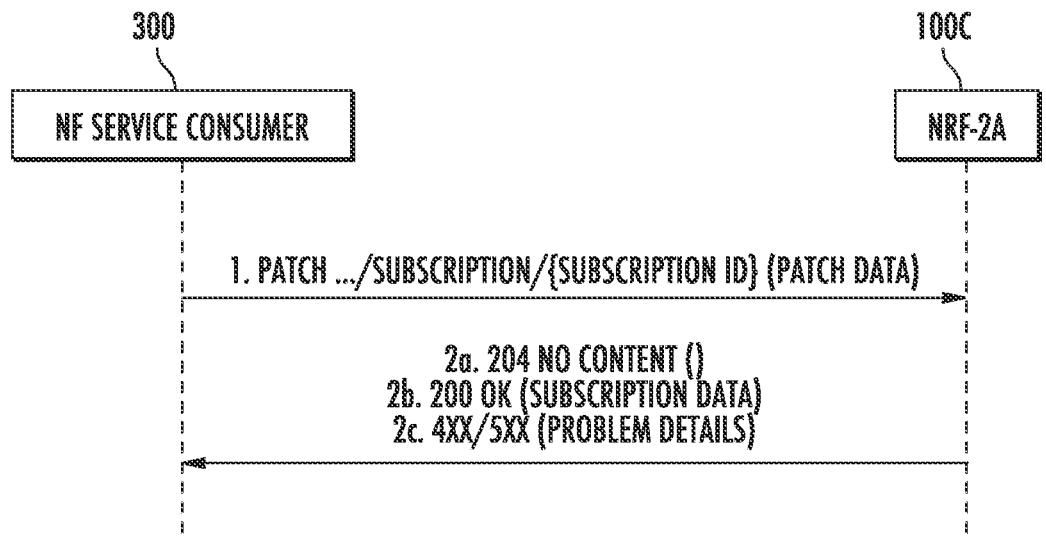
FIG. 4 is a message flow diagram illustrating an exemplary procedure for updating an existing NF subscription.

In some scenarios, a consumer NF may wish to modify or delete an existing subscription. One scenario in which a consumer NF may wish to modify a subscription is to change the validity time of the subscription to keep the subscription from expiring. Such a scenario is illustrated in FIG. 4. In FIG. 4, consumer NF 300 signals with NRF-2A 100C to update a subscription. As per 3GPP TS 29.510, Section 5.2.2.5.6, a subscription to notifications regarding NF instances may be updated to refresh the validity time, when this time is about to expire. The NF service consumer may request a new validity time from the NRF, and the NRF answers with the new assigned validity time, if the operation is successful.

This operation is executed by updating the resource identified by "subscriptionID". The operation is invoked by issuing an HTTP PATCH request on the URI representing the individual resource received in the location header field of the 201 Created response received during a successful subscription. In line 1 of the message flow in FIG. 4, consumer NF 300 sends an HTTP PATCH message to NRF-2A 100C to update the subscription specified by the subscription ID in the PATCH message, which was received from NRF-2 100C in the 201 Created message (see FIG. 3). NRF-2A 100C will respond with a 204 No Content message, if NRF-2A 100C does not host the identified subscription, as indicated by step 2a in FIG. 4. NRF-2A 100C will respond with a 200 OK message if NRF-2A 100C hosts the identified subscription and the update is successful, as indicated by step 2b in FIG. 4. NRF-2 100C will respond with a 4XX or 5XX error message if NRF-2 100C experiences an error in updating the subscription, as illustrated by step 2c in FIG. 4.

The point to highlight here is that consumer NFs are not aware of all the NRF instances deployed as georedundant NRF sets and so will not be able to route to other NRF instances of a georedundant NRF set when one or more of the NRFs in the NRF set becomes unavailable. For example, if NRF-2A 100C fails after the subscription is created, consumer NF 300 will not be able to contact NRF-2B 100D (see FIG. 1) that is in the same NRF set as NRF-2A 100C to update a subscription because consumer NF 300 may not be aware that NRF-2B 100D exists.

Figure 5:
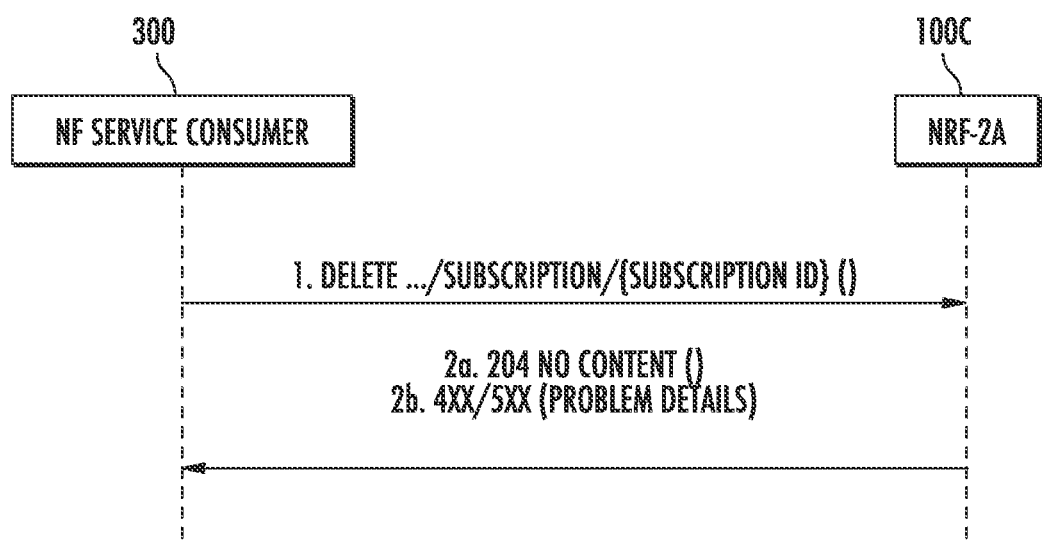
FIG. 5 is a message flow diagram illustrating an exemplary procedure for deleting an existing NF subscription.

Another scenario in which a consumer NF may wish to send a message to an NRF regarding an existing subscription is when the consumer NF desires to delete the subscription. This scenario is illustrated in FIG. 5.

In line 1, consumer NF 300 sends a delete message to NRF-2 100C. The delete message includes the subscription ID for the subscription identified in the 201 created response received from NRF-2A 100C (see FIG. 2). If the delete operation is successful, NRF-2A 100C returns a 204 No Content message, as indicated by step 2a. If the delete procedure results in an error, NRF-2A 100C returns a 4XX or 5XX error message with the error details, as indicated by step 2b. If NRF-2A 100C is unreachable and/or out of service and cannot respond to the delete message, NF consumer 300 may not be able to contact a mated NRF in the same NF set as NRF-2A 100C.

Figure 6:
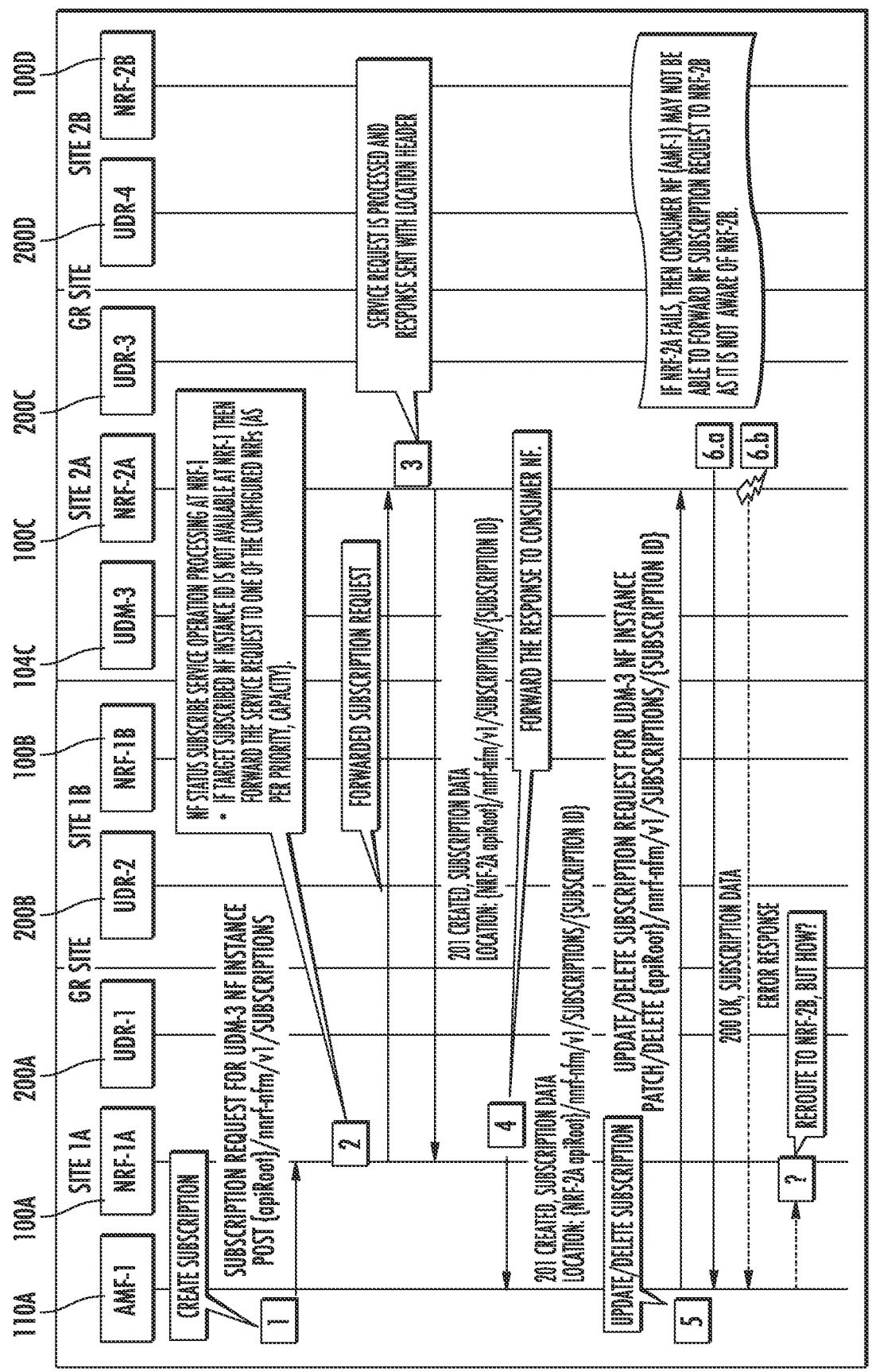
FIG. 6 is a message flow diagram illustrating failed routing of a message relating to an existing NF subscription when a remote NRF becomes unavailable.

FIG. 6 illustrates this problem in more detail. Referring to FIG. 6, NRFs 100A and 100B form a mated pair and NRFs 100C and 100D form a mated pair located at a geographically diverse site from NRFs 100A and 100B. In line 1 of the message flow in FIG. 6, AMF 110A sends a create subscription request message to create a subscription to receive updates regarding the status of UDM-3 104C. AMF 110A sends the subscription request to NRF-1A 100A. The create subscription request identifies UDM-3 104C as the NF instance to which AMF 110A wishes to subscribe to receive updates.

NRF-1A 100A determines that it does not have the requested subscription data for the target NF instance ID indicated in the subscription request. Accordingly, NRF-1A 100A in line 2 forwards the subscription request to a next hop NRF based on operator configured criteria, which may include priority, capacity, load balancing, or other criteria. In the illustrated example, NRF-1A 100A forwards the subscription request to NRF-2A 100C located in site 2A.

In line 3 of the message flow diagram NRF-2A 100C determines that it has the requested NF instance data for UDM-3 104C and responds with a 201 Created message that includes a subscription ID and a location header identifying NRF-2 100C as the NRF that accepted the subscription. In line 4 of the message flow diagram NRF-1A 100A receives the subscription response and forwards the response to AMF-1 110A.

In line 5 of the message flow diagram, AMF-1 110A sends an update or delete subscription request to the NRF identified in the location header in the subscription response message received in line 4. In the illustrated example, the update or delete message is sent to NRF-2A 100C. Line 6a of the message flow diagram indicates the case where NRF-2A 101C has the requested subscription data and responds with a 200 OK message indicating that the subscription has been successfully updated. Line 6b of the message flow diagram illustrates the case where NRF-2A 100C fails and is unable to respond to the update or delete subscription request. AMF-1 110A is unable to contact NRF 2B 100D because AMF-1 110A is not aware of NRF-2B 100D.

In order to avoid the difficulty illustrated in FIG. 6, in in example, indirect communications via an SCP may be used with remote georedundant NRFs. The SCP may learn or be configured with the NRF topology deployed in the network. The NRF topology may be stored in an NRF topology database residing in the SCP with records corresponding to remote NRF sets, where the records indicate the identities of remote NRF instances that are members of each NRF set. When one NRF of a remote georedundant NRF deployment becomes unavailable, the SCP uses the learned/configured NRF topology information to route subsequent messages relating to the georedundant mate of the remote SCP.

Using indirect communications via an SCP for communicating with a remote NRF is not specified in 3GPP indirect communications models. By using the SCP to maintain remote NRF topology information, the need for all consumer NFs to be configured with remote NRF topology information is reduced. Because the SCP handles remote NRF failures, consumer NFs are not required to include the processing capability to handle such scenarios. In addition, a trust relationship is not required between the remote NRFs and every consumer NF in the network. Instead, the remote NRFs only need to have trust relationships with the SCPs, which are fewer in number than consumer NFs served by the SCPs.

Figure 7:
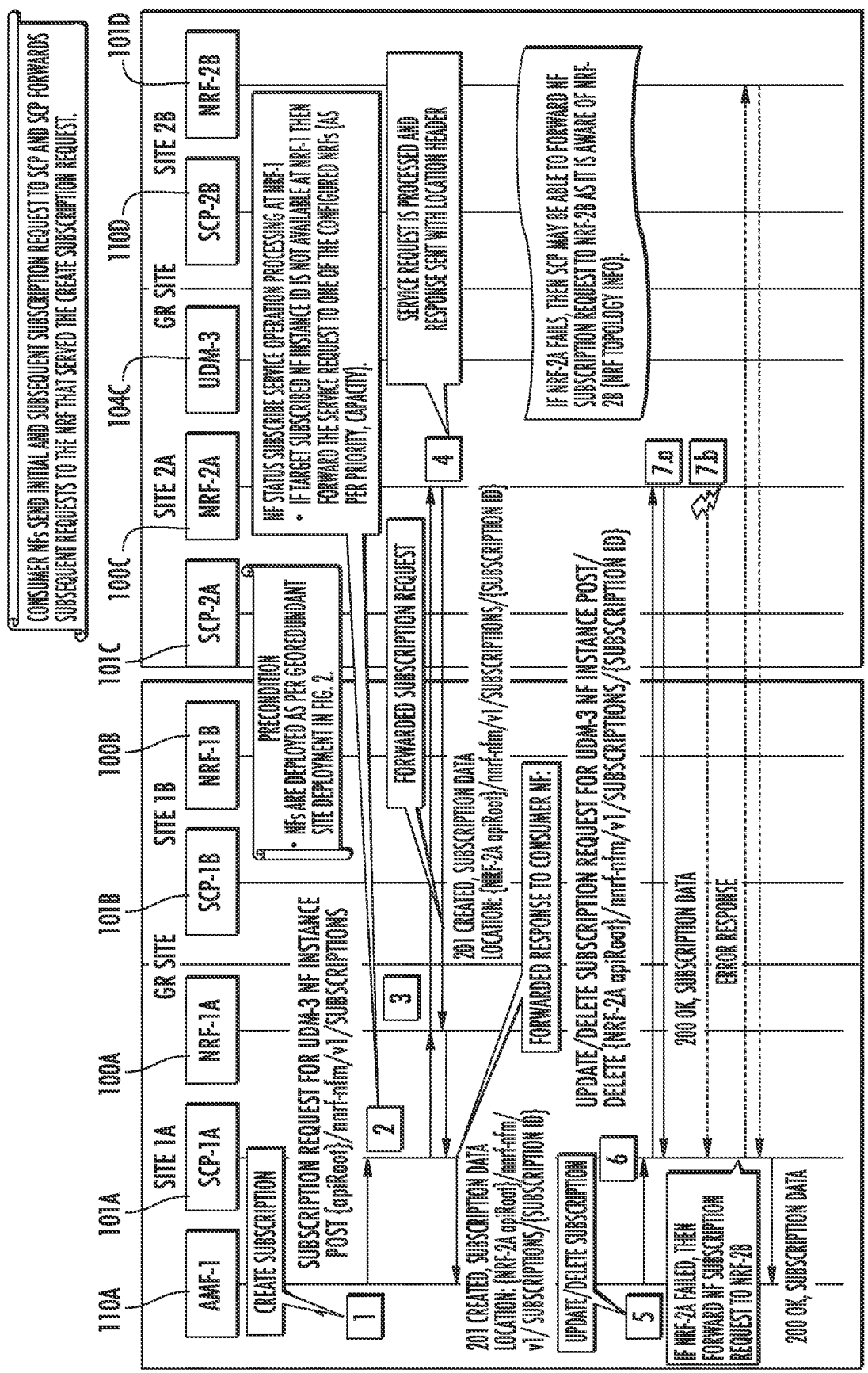
FIG. 7 is a message flow diagram illustrating optimized routing of a message relating to an existing NF subscription using indirect communications via an SCP.

FIG. 7 is a flow chart illustrating optimized routing of messages relating to existing subscriptions using indirect communications via an SCP. Referring to FIG. 7, in line 1, AMF-1 110A sends a create subscription request to subscribe to updates regarding UDM-3 104C. The create subscription request is sent to local SCP-1A 101A. In line 2, SCP-1A 101A routes the create subscription request to local NRF-1A 100A. In line 3, NRF-1A 100A, acting as an intermediate forwarding NRF, determines that it does not have the NF profile for UDM-3 104C Accordingly, NRF-1A 100A forwards the create subscription request to the next hop NRF, which in the illustrated example is NRF-2A 100C. The next hop NRF may be selected based on operator configured parameters, such as priority or capacity.

In line 4 of the message flow diagram, NRF-2A 100C determines that it has the requested NF profile for UDM-3 104C and responds to the create subscription request by sending a 201 Created response message with the requested subscription data. The 201 Created response message includes a location header identifying NRF-2A 100C as the NRF that contains the NF profile information for the producer NF instance identified in the create subscription request. The 201 Created response message also includes a subscription identifier that identifies the subscription. SCP-1A 101A receives the 201 Created response and forwards the 201 Created response to AMF-1 110A.

In line 6, AMF-1 110-A sends an update or delete message concerning the subscription to SCP-1A 101A. SCP-1A 101A routes the update or delete message to the NRF identified in the apiRoot of the location header of the response message received by AMF-1 110 in the subscription response message, which in FIG. 7 is NRF-2A 100C. If NRF-2A 100C is available, it responds as indicated in line 7a with a 200 OK message. If NRF-2A 100C fails, as indicated by line 7b, SCP-1A re-sends the subscription update or delete message to NRF-2B 100D, the georedundant mate of the failed NRF-2A 100C. SCP-1A 101A is able to re-send the subscription update or delete message to NRF 2B 1010 because SCP-1A 101A is either configured with or learns the NRF topology information in the network. For example, SCP-1A 101A may be configured with NRF topology information by the network operator so that if one NRF in an NRF set fails, SCP-1A 101A can re-send a message to an available member of the NF set. SCP-1A 101A can learn the NRF topology from a root or higher-level NRF in a hierarchy of NRFs that distributes the NRF topology information to lower level NRFs in the hierarchy. In the indirect communications model described herein, such NRF-to-NRF communications may be forwarded via SCPs, such as SCP-1A 101A. SCP-1A 101A may monitor such communications for NRF topology information and store any detected NRF topology information in the NRF topology database local to SCP-1A 101A.

Georedundant mate NRF 1010 responds to the subscription update or delete request from SCP-1A 101A with a 200 OK message. SCP-1A 101A forwards the 200 OK message to AMF-1 110A. Thus, FIG. 7 illustrates the case where a local SCP uses configured or learned NRF topology information to re-send a message relating to an existing subscription to a georedundant mate of a failed NRF.

In addition to re-sending messages relating to an existing subscriptions to a georedundant mate of a failed NRF, an SCP may also use the learned or configured NRF information to route any type of SBI request message to a georedundant mate of a failed NRF. In general, according to 3GPP specifications, NRF-to-NRF communications do not involve an SCP. None of the indirect communications models in 3GPP TS 29.500 involve NRF to NRF communications. Similarly, as illustrated in FIG. 3, the intermediate forwarding NRF communications specified in 3GPP TS 29.510 does not involve an SCP.

Figure 8:
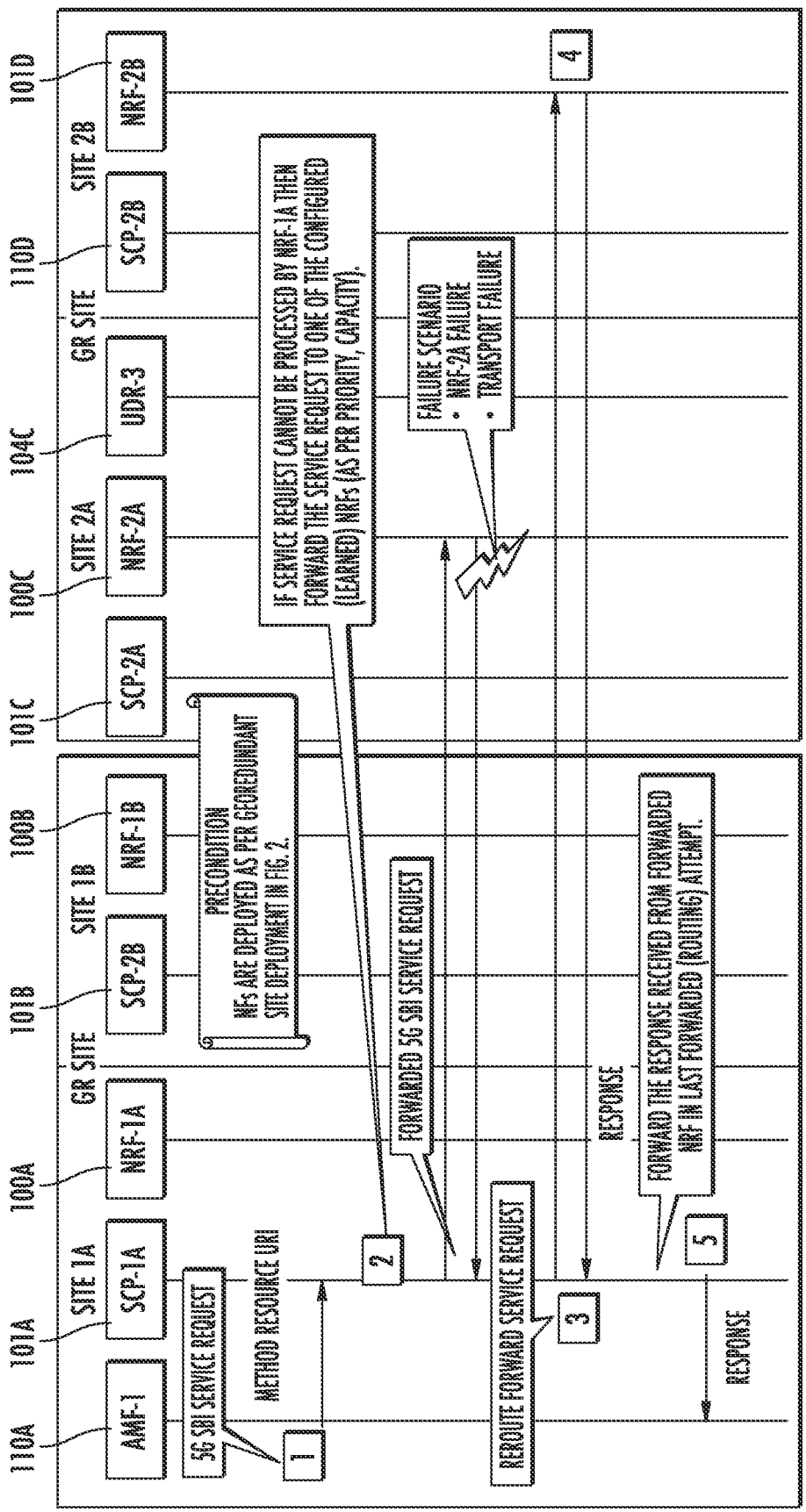
FIG. 8 is a message flow diagram illustrating optimized routing of an SBI request message to a remote NRF via indirect communications using an SCP.

FIG. 8 illustrates the generic case of an SCP forwarding an SBI request message to a georedundant mate of a failed NRF. Referring to FIG. 8, in line 1, AMF-1 110A sends an SBI request message to SCP-1A 101A. In line 2, SCP-1A 101A forwards the SBI request message to NRF-2A 100C. SCP-1A 101A knows that the SBI request message cannot be processed by local NRF-1 100A and therefore forwards the request to NRF-2A 100C as per configured or learned NRF topology, priority, and capacity. NRF-2A 100C fails or a transport failure occurs.

In line 3, SCP-1A 101A detects the inability of NRF-2A 100C to process the SBI request message by failing to receive a response to the SBI request message within a configured time and resends the SBI request message to a georedundant mate NRF, NRF-2B 100D. In line 4, NRF-2B 100D responds to SCP-1 101A. In line 5, SCP-1A 101A forwards the response to AMF-1 110A. In another example, SCP-1A 101A may determine that NRF-2A 100C is unable to process the SBI request message if NRF-2A 100C sends an error response to the SBI request message with a configured hypertext transfer protocol (HTTP) status code for alternate routing to a mate NRF.

Figure 9:
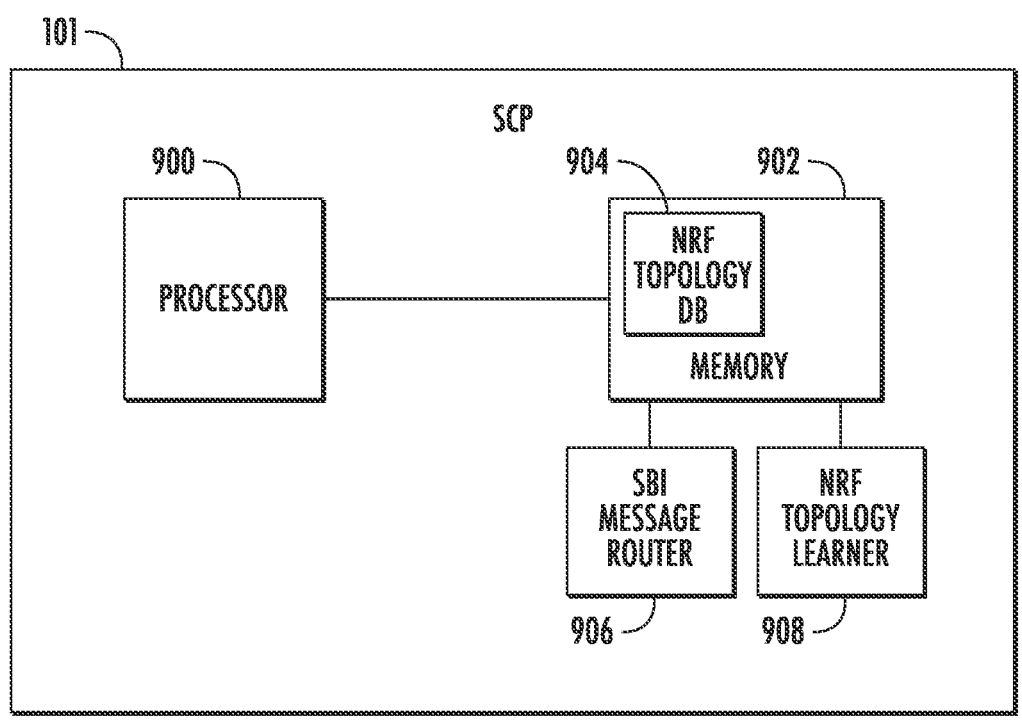
FIG. 9 is a block diagram illustrating an exemplary architecture for an SCP capable of optimized routing of SBI request messages to a remote NRF.

FIG. 9 illustrates an exemplary architecture of SCP-1A 101A. In FIG. 9, SCP-1A 101A includes at least one processor 900 and a memory 902. SCP-1A 101A includes an NRF topology database 904 that may be resident in memory 902 and may store configured and/or learned NRF topology information. SCP-1A 101A further includes an SBI message router 906 that routes SBI request messages based on location information headers in SBI request messages and that uses NRF topology information stored in NRF topology database to resend SBI request messages, including messages relating to existing subscriptions, to georedundant mates of remote NRFs that become unavailable or otherwise unable to process the SBI request messages. SCP-1A 101A may further include an NRF topology learner 908 that learns NRF topology information based on messaging received from a root or other level NRF in an NRF hierarchy. SBI message router 906 and NRF topology learner 908 may be implemented using computer executable instructions stored in memory 902 and executed by processor 900.

Figure 10:
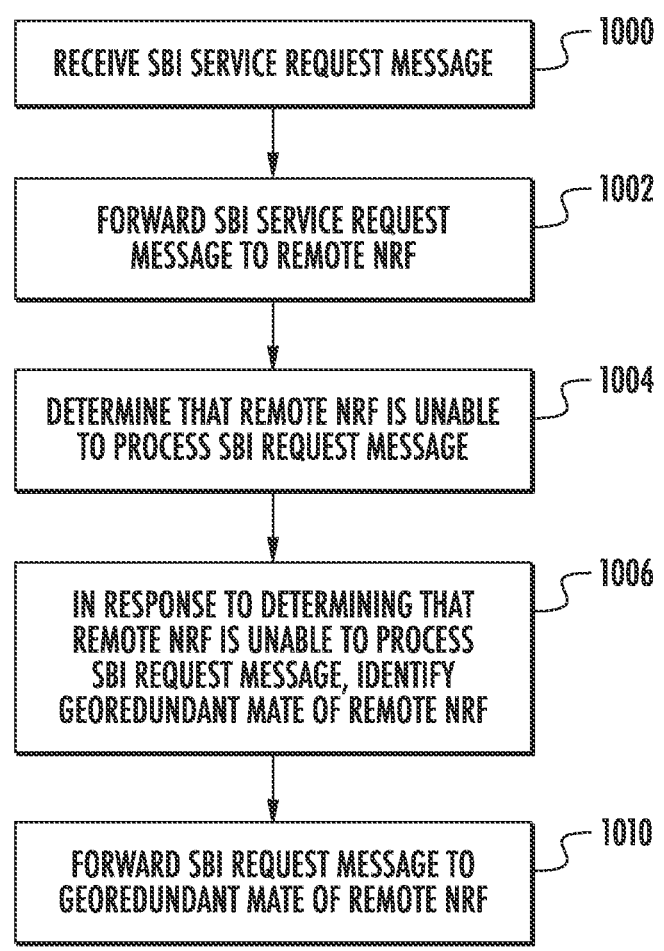
FIG. 10 is a flow chart illustrating an exemplary process for optimized routing of SBI request messages to remote NRFs via indirect communications using an SCP.

FIG. 10 is a flow chart illustrating an exemplary process for optimized routing of SBI request messages to remote NRFs using indirect communications via an SCP. The steps illustrated in FIG. 10 may be performed by an SCP, such as SCP-1A 101A described above. Referring to FIG. 10, in step 1000, the process includes receiving a service based interface (SBI) request message. The SBI request message may include information, such as an apiRoot attribute, that identifies a remote NRF. In one example, the SBI request may be a message relating to an existing subscription with the remote NRF, such as a request to update or delete the subscription. In another example, the SBI request message may be another message destined for a remote NRF, such as a message for creating a subscription with the remote NRF.

In step 1002, the process includes forwarding the SBI request message to a remote NRF. For example, SCP-1A 101A may forward the message to the remote NRF identified in a location header of the SBI request message.

In step 1004, the process includes determining that the remote NRF is unable to process the SBI request message. For example, SCP-1A 101A may start an SBI service response timer at the time of sending the SBI request message in step 1002. If the timer reaches a predetermined timeout value and a response to the SBI request message has not been received, SCP-1A 101A may determine that a response timeout has occurred. Alternatively, if SCP-1A 101A receives an error response with a configured hypertext transfer protocol (HTTP) status code for alternate routing to a mate NRF, SCP-1A 101A may determine that the NRF is unable to process the SBI request message.

In step 1006, the process includes, in response to determining that the remote NRF is unable to process the SBI request message, identifying a georedundant mate of the remote NRF. For example, SCP-1A 101A may perform a lookup in its NRF topology database using the NF instance ID of the NRF received in an SBI request message from a consumer NF. The result of the lookup may be an NRF set that includes the NRF that is unable to process the SBI request message. SCP-1A 101A may select another NRF from the NRFs in the NF set based on priority attributes and/or capacity information stored for the remote NRF in the NRF topology database. The NRF topology information stored in the NRF topology database may be configured by the network operator and/or learned by SCP-1A 101A, for example, from an NRF at a higher level in an NRF hierarchy than the remote NRFs in the NRF set.

In step 1008, the process includes forwarding the SBI request message to the georedundant mate NRF of the remote NRF that is unable to process the SBI request message. For example, SCP-1A 101A may forward the SBI request message to remote NRF-2B 100D when NRF-2A 101C is not available. SCP-1A 101A in one example may send the SBI request message to remote NRF-2B 100D without first sending the message to remote SCP-2B 101D. In another example, SCP-1A 101A may send the SBI request message to remote SCP-2B 1010, and remote SCP-2B 101D may forward the SBI request message to remote NRF-2B 100D. Prior to forwarding the SBI request message to the georedundant mate of the remote NRF that is unable to process the SBI request message, SCP-1A 101A may modify the apiRoot parameter in the SBI request message to identify the georedundant mate. In FIG. 8, for example, SCP-1A 100A may modify the apiRoot parameter to identify NRF-2B 100D, instead of NRF-2A 100C.

Advantages of the subject matter described herein include network reachability from consumer NFs to remote NRFs deployed in the network without requiring the consumer NFs to be configured with the identities of the remote NRFs. By relying on a local SCP to store the NRF topology information for the network, the scalability of the network architecture is increased over a solution where each consumer NF must be configured with all of the NRF topology information for a network. In addition, the solution described herein reduces the security surface for attacks, as all consumer NFs need not store the contact information of remote NRFs.

The disclosure of each of the following references is hereby incorporated herein by reference in its entirety.

REFERENCES 1. 3GPP TS 23.502 V16.7.0 (2020-12), 3rd Generation Partnership Project; Technical Specification Group Services and System Aspects; Procedures for the 5G System (5GS); Stage 2, (Release 16).
2. 3GPP TS 23.501 V16.7.0 (2020-12), 3rd Generation Partnership Project; Technical Specification Group Services and System Aspects; System Architecture for the 5G System (5GS), Stage 2; (Release 16).
3. 3GPP TS 29.510 V17.0.0 (2020-12), 3rd Generation Partnership Project; Technical Specification Group Core Network and Terminals; 5G System; Network Function Repository Services; Stage 3 (Release 17).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for optimized routing of service based interface (SBI) request messages to remote network function (NF) repository functions (NRFs) using indirect communications via a service communication proxy (SCP), the method comprising:
    at an SCP including at least one processor:
        receiving an SBI request message, wherein receiving an SBI request message includes receiving an SBI request message associated with an existing subscription with the remote NRF;
        forwarding the SBI request message to a remote NRF;
        determining that the remote NRF is unable to process the SBI request message;
        in response to determining that the remote NRF is unable to process the SBI request message, identifying a georedundant mate of the remote NRF; and
        forwarding the SBI request message to the georedundant mate NRF of the remote NRF that is unable to process the SBI request message.

2. The method of claim 1 wherein receiving an SBI request message associated with an existing subscription includes receiving a request to update or delete the existing subscription.

3. The method of claim 1 wherein determining that the remote NRF is unable to process the SBI request message includes determining that the remote NRF is unable to process the SBI request message in response to failing to receive a response to the SBI request message within a configurable timeout period or receiving an error response with a configured hypertext transfer protocol (HTTP) status code for alternate routing to a mate NRF.

4. The method of claim 1 comprising maintaining, at the SCP, an NRF topology database including NRF topology information.

5. The method of claim 4 wherein identifying the georedundant mate of the remote NRF includes performing a lookup in the NRF topology database, locating a record corresponding to an NRF set of which the remote NRF is a member, and extracting an identity of the georedundant mate from the record.

6. The method of claim 4 wherein maintaining the NRF topology database includes populating the NRF topology database with NRF topology information configured by a network operator.

7. The method of claim 4 comprising learning the NRF topology information and wherein maintaining the NRF topology database comprises populating the NRF topology database with the learned NRF topology information.

8. The method of claim 7 wherein learning the NRF topology information includes receiving the NRF topology information from an NRF at a higher level in an NRF hierarchy than the remote NRF.

9. The method of claim 1 comprising modifying an apiRoot attribute in the SBI request message to identify the georedundant mate of the remote NRF prior to forwarding the SBI request message to the georedundant mate of the remote NRF.

10. A system for optimized routing of service based interface (SBI) request messages to remote network function (NF) repository functions (NRFs) using indirect communications via a service communication proxy (SCP), the system comprising:
    an SCP including at least one processor; and
    an SBI message router implemented by the at least one processor for receiving an SBI request message, forwarding the SBI request message to a remote NRF, determining that the remote NRF is unable to process the SBI request message, in response to determining that the remote NRF is unable to process the SBI request message, wherein the SBI request message is associated with an existing subscription with the remote NRF, identifying a georedundant mate of the remote NRF, and forwarding the SBI request message to the georedundant mate NRF of the remote NRF that is unable to process the SBI request message.

11. The system of claim 10 wherein the SBI request message comprises a request to update or delete the existing subscription.

12. The system of claim 10 wherein the SBI message router is configured to determine that the remote NRF is unable to process the SBI request message in response to failing to receive a response to the SBI request message within a configurable timeout period or receiving an error response with a configured hypertext transfer protocol (HTTP) status code for alternate routing to a mate NRF.

13. The system of claim 10 comprising an NRF topology database located in memory of the SCP and including NRF topology information.

14. The system of claim 13 wherein the SBI message router is configured to identify the georedundant mate of the remote NRF by performing a lookup in the NRF topology database, locating a record corresponding to an NRF set of which the remote NRF is a member, and extracting an identity of the georedundant mate from the record.

15. The system of claim 13 wherein the NRF topology information in the NRF topology database is configured by a network operator.

16. The system of claim 13 comprising an NRF topology learner implemented in the SCP for learning the NRF topology information from an NRF at a higher level in an NRF hierarchy than the remote NRF and wherein the NRF topology learner is configured to populate the NRF topology database with the learned NRF topology information.

17. The system of claim 13 wherein the SBI message router is configured to modify an apiRoot attribute in the SBI request message to identify the georedundant mate of the remote NRF prior to forwarding the SBI request message to the georedundant mate of the remote NRF.

18. A non-transitory computer readable medium having stored thereon executable instructions that when executed by a processor of a computer control the computer to perform steps comprising:
    at a service communication proxy (SCP):
        receiving a service based interface (SBI) request message, wherein receiving an SBI request message includes receiving an SBI request message associated with an existing subscription with the remote NRF;

forwarding the SBI request message to a remote network function (NF) repository function (NRF);

determining that the remote NRF is unable to process the SBI request message;

in response to determining that the remote NRF is unable to process the SBI request message, identifying a georedundant mate of the remote NRF; and forwarding the SBI request message to the georedundant mate NRF of the remote NRF that is unable to process the SBI request message.

\* \* \* \* \*